United States Patent [19]

Perkins

[11] Patent Number: 4,899,346
[45] Date of Patent: Feb. 6, 1990

[54] PATH LENGTH CONTROL SYSTEM FOR MAGNETIC MIRROR DITHERED RING LASER GYROS

[75] Inventor: Harley A. Perkins, Brookline, Mass.

[73] Assignee: Northrop Corporation, Hawthorne, Calif.

[21] Appl. No.: 146,443

[22] Filed: Jan. 21, 1988

[51] Int. Cl.[4] ............................................. H01S 3/13
[52] U.S. Cl. ....................................... 372/32; 372/20;
372/23; 372/33; 372/37; 372/94; 356/350
[58] Field of Search ..................... 372/32, 94, 23, 33,
372/34, 37, 19, 20; 356/350

[56] References Cited

U.S. PATENT DOCUMENTS

| | | | |
|---|---|---|---|
| 3,411,849 | 11/1968 | Aronowitz | 372/32 |
| 3,851,973 | 12/1974 | Macek | 356/350 |
| 4,195,908 | 4/1980 | Kestigian et al. | 356/350 |
| 4,267,478 | 5/1981 | Ljung et al. | 356/350 |
| 4,284,964 | 8/1981 | Maier, Jr. | 372/32 |
| 4,320,947 | 3/1982 | Ljung et al. | 356/350 |
| 4,398,293 | 8/1983 | Hall et al. | 372/32 |
| 4,551,021 | 11/1985 | Callaghan et al. | 372/94 |
| 4,648,716 | 3/1987 | Egli | 372/94 |
| 4,672,618 | 6/1987 | Wijntjes et al. | 372/32 |
| 4,740,085 | 4/1988 | Lim | 372/94 |
| 4,779,279 | 10/1988 | Brown | 372/37 |

Primary Examiner—Frank Gonzales
Attorney, Agent, or Firm—Terry J. Anderson; Robert B. Block

[57] ABSTRACT

Path length error is computed from the output frequencies for the two states of magnetization of the magnetic mirror. The path length error signal is used to adjust the location of a path length control mirror to drive the path length error signal to zero. A table is provided for computing the path length control error signal for different regions in the graph of frequency versus gyro angular rate. In effect, the error signal is the difference between a reference frequency which depends on the temperature of the laser structure and an average of the output frequencies corresponding to the two magnetization states of the magnetic mirror.

9 Claims, 3 Drawing Sheets

BLOCK DIAGRAM 4,899,346

PATH LENGTH CONTROL SYSTEM FOR MAGNETIC MIRROR DITHERED RING LASER GYROS

BACKGROUND OF THE INVENTION

1. Field of the Invention

This invention relates to ring laser gyroscopes and more particularly to controlling the optical path length in a laser gyro.

2. Description of the Prior Art

In operating a ring laser gyroscope, the optical path length of the laser beam travelling within an optical cavity formed by three or more mirrors must be adjusted to an integral number of wavelengths around the optical path. Temperature and other environmental variations can change the optical path length necessitating path length readjustment at frequent intervals. Usually path length is maintained at a resonant cavity peak where the output power, as evidenced by beam intensity, is held at near peak intensity by a control servo loop. Elements in this control loop include an optical sensor (e.g., photodiode), amplifier, phase detector, integrator and an electro-mechanical driver (a servo) which moves one of the mirrors toward or away from the center of the optical cavity plane along a normal to the mirror surface. To maintain the output beam intensity at near peak intensity, a sinusoidal "dither signal" is often applied to the servo drive, which tends to detune the cavity slightly. The sinusoidal signal is also applied as a reference signal to a phase detector to supply an average error signal back to the servo and bring the cavity tuning back to the peak resonant condition. Most ring gyros currently use this method of maintaining path length control.

As is well known to those skilled in the art, laser gyros typically employ some form of biasing to prevent frequency lockup at low rotation rates of the two optical beams counter-rotating in the cavity. In some laser gyros the biasing is mechanically induced by "dithering" the gyro (i.e., rotation of the gyro structure in the plane of the optical cavity). Other laser gyros employ a mirror having a magnetic coating to provide the bias needed to prevent frequency lockup of the counter-rotating beams at low rotation rates. Such "magnetic" mirrors can be switched to either of two stable states. The magnetic mirror provides a slight phase shift in the wavefront of an optical beam upon reflection from the magnetic mirror surface due to the "Kerr magneto-optic effect." For a given magnetic mirror state, this phase shift is different for the optical ight moving in one direction than it is for light moving in the opposite direction along the same optical path, resulting in a difference in frequencies between the two counter-rotating beams even when the gyro is not being rotated about its axis (normal to the laser plane). By using a combining prism, the two counter-rotating beams can be made nearly colinear to produce an output optical signal proportional to the difference in frequency between the two beams (because of the interference between the beam frequencies).

In maintaining the cavity tuning at a resonance peak, however, the magnetic mirror of a magnetically dithered gyro can introduce an additional error source over the more conventional "mechanically dithered ring laser gyro" or "rate biased ring laser gyro" when the optical path length is controlled by utilizing a dither signal to slightly detune the cavity as discussed above. As will be described more fully hereinbelow, dithering the path length control mirror position in a "magnetically dithered" gyro can introduce output rate errors, because the apparent output rate is altered by the dither signal.

SUMMARY OF THE INVENTION

It is therefore an object of the present invention to provide a technique of controlling the optical path length which does not require beam intensity measurements or dithering of the path length control mirror.

A further object of this invention is to provide a path length control technique which is simpler and less costly than known techniques.

These and other objects of the present invention are achieved by monitoring the output frequencies for the two states of magnetization of the magnetic mirror in a magnetically dithered laser gyro, and computing the path length error from these two output frequencies and a reference frequency characteristic of the magnetic mirror. The location of a path length control mirror is then adjusted to drive the path length error to zero.

BRIEF DESCRIPTION OF THE DRAWING

The invention disclosed herein will be understood better with reference to the drawing of which.

DESCRIPTION OF THE PREFERRED EMBODIMENT

Figure 1:
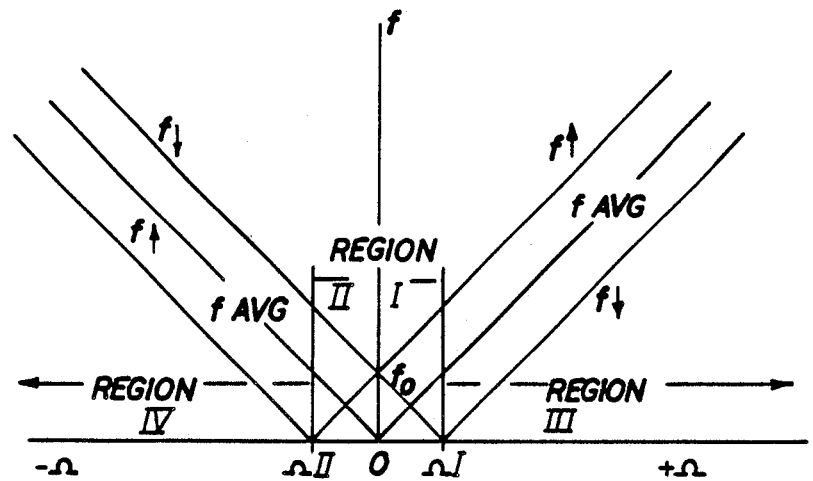
FIG. 1 is a graph of output difference related frequency as a function of gyro angular rate.

As discussed above, the magnetic mirror in a magnetically dithered gyro provides the bias needed to prevent lockup of the two counter-rotating optical beams in the cavity at low rotation rates. The two counter-rotating beams are "heterodyned" to produce an output optical signal proportional to the difference in frequency between the two beams. FIG. 1 shows an idealized plot of this output difference frequency, f (Hz), as a function of $\Omega$, the angular rotation rate of the gyro plane (e.g., degrees/second) for each of the two magnetically saturated states of a magnetic film deposited on a magnetic mirror. In FIG. 1, f ↑ (hereinafter called $f_{up}$) represents the output difference frequency when the mirror is in one state of magnetization and f ↓ (herein after called $f_{dn}$) is the output difference frequency when the magnetic mirror is in its other state of magnetization. Typically, a magnetic film is deposited during the mirror fabrication process in the presence of a magnetic field oriented to produce a magnetic anisotropy axis perpendicular to the lasing plane. Anisotropic thin films of square B-H loop materials (such as permalloy) have two easy directions of magnetization such that the magnetic moment is aligned along the anisotropy axis in the absence of any externally applied fields. A fully switched film is a single magnetic domain aligned at zero or pi radians with respect to the anisotropy axis. Thus, the two states of the film magnetization along the anisotropy axis result in output frequency plots shown by $f_{up}$ and $f_{dn}$ in FIG. 1. Gyro scale factor is given by the slope of the f vs. $\Omega$ plot. Bias is evident from examining the two output frequencies obtained as a result of switching the magnetic film between its two stable states along the anisotropy axis. When the gyro is not being rotated, both states of the mirror film's magnetization produce output frequencies shown as $f_O$ in FIG. 1. When the gyro is rotated about its axis (normal to the lasing plane), the two output frequencies obtained for $f_{up}$ and $f_{dn}$ will not be the same, but behave ideally as shown in FIG. 1. The term "ideally" is used, because near the points where $f_{up}$ and $f_{dn}$ approach zero, the scale factor becomes non-linear and a lock-in zone is observed (e.g., 1 to 3 degrees/second is typical of a 15 cm ring laser gyro operating a 1.15 micron wavelength where with a permalloy film 15 degrees/second is a typical center of each of the lock zones.) The desired output frequency for navigational or vehicle control purposes is given the by line labeled $f_{avg}$ which is easily calculated by the algorithm titled "RATE" given in Table 1.

quired to maintain the cavity at resonance as in prior techniques. The algorithm used to calculate an error signal is shown in Table 1 and labeled "PLC error". As with output rate, Table 1 sets forth four regions for the path length control error calculation.

Figure 5:
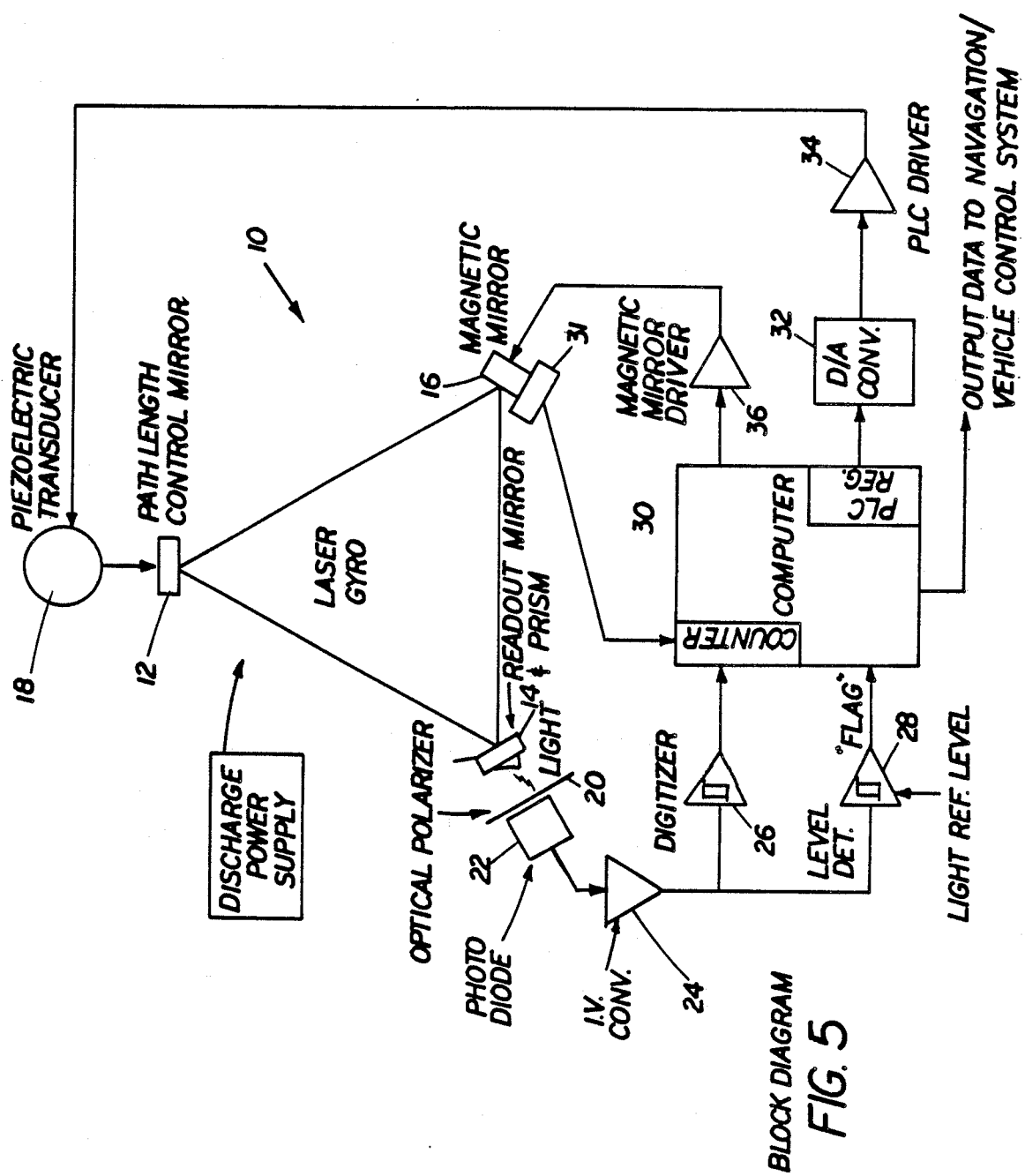
FIG. 5 is a block diagram of the path length control system disclosed herein.

An implementation of the present invention is shown in FIG. 5. A laser gyro 10 includes a path length control mirror 12, a readout mirror and prism 14 and a magnetic mirror 16. The position of the path length control mirror 12 is controlled by a piezoelectric transducer 18. Light from the readout mirror and prism 14 passes through an optical polarizer 20 and is detected by one or more photodiodes 22. The photodiode 22 produces a signal including values of $f_{up}$ and $f_{dn}$. The output of the photodiode 22 enters a current to voltage converter 24 and the output of the converter 24 is fed to digitizers (e.g. voltage comparators) 26 and 28. The outputs from digitizers 26 and 28 form inputs to a computer 30. The reference frequency, $f_O$, set forth in Table 1 is a characteristic of the magnetic mirror 16 determined by the average magnetic moment of the film and materials

TABLE 1

|  | If $f_{up} > f_{dn}$ | | If $f_{up} < f_{dn}$ | |
| --- | --- | --- | --- | --- |
| AND | If $\frac{f_{up} + f_{dn}}{2} \leq f_0$ | If $\frac{f_{up} + f_{dn}}{2} > f_0$ | If $\frac{f_{up} + f_{dn}}{2} \leq f_0$ | If $\frac{f_{up} + f_{dn}}{2} > f_0$ |
| RATE | $\Omega = \frac{K}{2} |f_{up} - f_{dn}|$ | $\Omega = \frac{K}{2} (f_{up} + f_{dn})$ | $\Omega = -\frac{K}{2} |f_{up} - f_{dn}|$ | $\Omega = -\frac{K}{2} (f_{up} + f_{dn})$ |
| PLC ERROR | $e = f_0 - \frac{(f_{up} + f_{dn})}{2}$ | $e = f_0 - \frac{|f_{up} - f_{dn}|}{2}$ | $e = f_0 - (f_{up} + f_{dn})$ | $e = f_0 - \frac{|f_{up} - f_{dn}|}{2}$ |
| REGION | I | III | II | IV |

Figure 3:
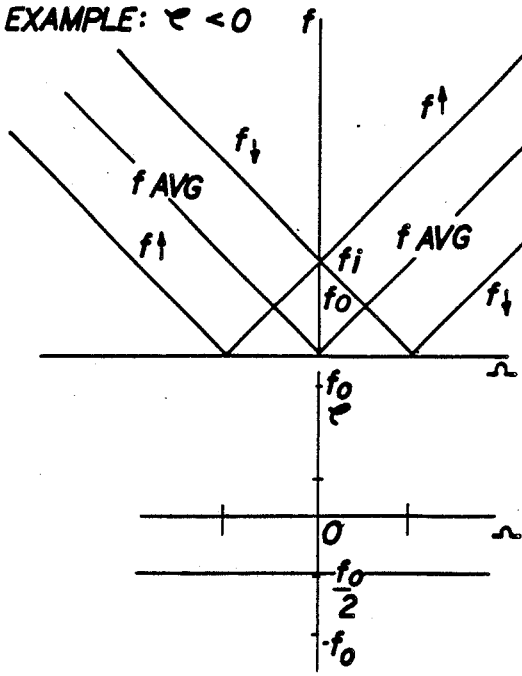
FIGS. 3 and 4 are graphs of output difference related frequency as a function of gyro angular rate with the optical cavity being tuned slightly off peak in either direction.
Figure 4:
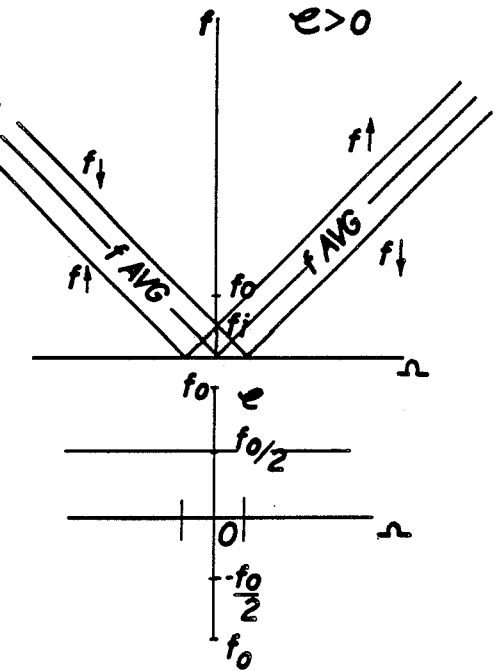

By using a magnetic mirror, the lock-in zone is moved from $\Omega$=zero to the two bias points $\Omega I$ and $\Omega II$. As discussed above, a property of magnetic mirror bias observed in ring laser gyros is that the actual frequency, obtained for any given magnetic mirror state or rotation rate input, is a function of the path length mirror position relative to the peak intensity of the cavity output. This relationship is shown for a typical gyro in FIG. 2. The cause of this frequency shift with path length control position is believed to be related to a non-reciprocal loss mechanism characteristic of magnetic mirrors used in ring laser gyros. Regardless of the cause, however, the effect is a definite characteristic of these magnetically dithered gyros. FIGS. 3 and 4 show the effect upon the scale factor plots as a result of the cavity being tuned slightly off peak in either direction. It is this variation in frequency which can result in an additional error source in gyro operation when the path length is dithered as discussed above. The present invention includes, among other things, a technique for controlling optical path length which does not require measuring beam intensity or dithering the path length control signal in order to maintain the laser at resonance.

Figure 2:
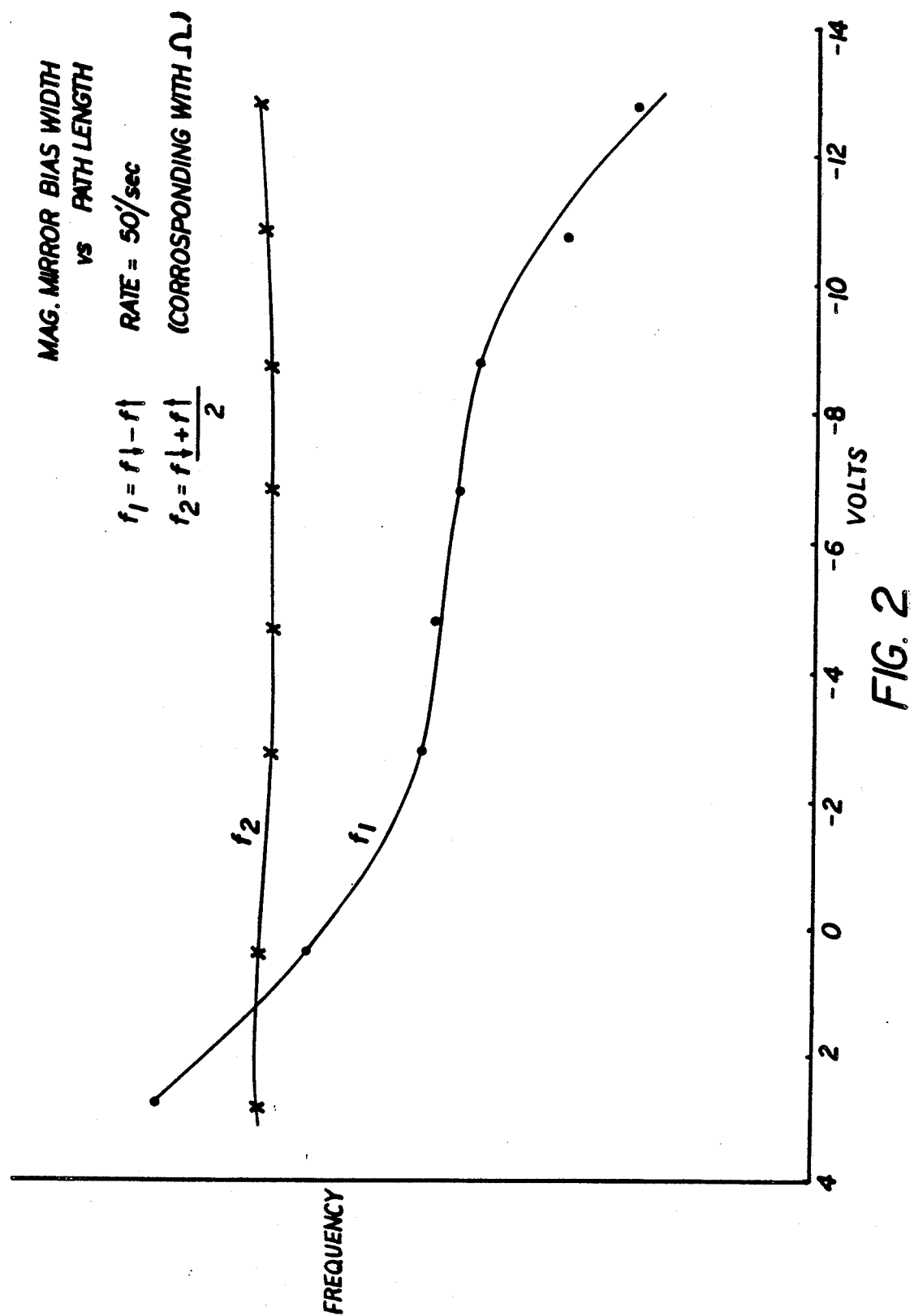
FIG. 2 is a graph of magnetic mirror bias frequency versus optical path length (presented in the graph as piezoelectric mirror position driver voltage)

Thus, the present invention exploits the characteristic curve shown in FIG. 2 and the implications of that curve as shown in FIGS. 3 and 4 to provide a control mechanism which maintains path length control at or near the peak of cavity resonance. Control is achieved simply by observing the two frequencies corresponding with the two switched states of the magnetic mirrors and using an algorithm as in Table I to calculate an error signal which is then applied through a digital to analog converter along with a fixed level signal corresponding to a previously determined cavity resonance peak. In this way, output intensity is not used or reused in the dielectric film coating used to enhance reflectivity and the laser cavity geometry. The average magnetic moment amplitude should obey the Currie-Weiss law of magnetic moment vs. temperature. Changes in ambient temperature are sensed by a temperature transducer 31 and used in conjunction with a stored model for magnetic moment (corresponding with $f_O$) versus temperature to compute $f_O$ thereby compensating for temperature changes.

The computer 30 calculates rate output data (proportional to the mechanical rotation rate of the gyro around the axis perpendicular to the lasing plane of the gyro 10) and the PLC error signal (discussed above) as shown in Table 1. The path length control error computation signal passes through a digital to analog converter 32 and to a path length control driver 34 which drives the piezoelectric transducer 18 so as to drive the PLC error signal to zero thereby optimizing the optical path length. The magnetic mirror 16 is driven by a magnetic mirror driver 36.

The output beam is passed through a p-mode polarizer 20 to recognize the desired polarization (p-mode is required to produce a magnetic mirror bias) of the laser beam and is sensed to determine that the gyro tuning is in the right vicinity for the computer 30 to be able to bring the cavity tuning to peak and maintain it there. In the absence of p-polarized light, the computer 30 generates a ramp of voltage to the D-A converter 32 continuing until light is sensed by the photodiode 22. At this time, a signal will flag the computer that ramping should stop and application of the PLC control loop algorithm as given in Table 1 should commence. If the light signal should decrease sufficiently to remove the flag to the computer, the computer will reinitiate ramping the path length voltage until the p-polarized light is sensed once again. In this way, path length control can be re-acquired after a condition which would cause its loss (anything which decreases the sensed intensity below the level that establishes the flag signal to the computer). The magnetic mirror 16 is switched by the computer 30 at a convenient rate within the bandwidth limitations imposed by the electronic circuitry (typically at about 100 Hz, although readily possible at frequencies up to 100 KHz or higher).

An alternative readout technique using two photodiodes at 22, two I-V converters, two digitizers 26, and control logic is commonly used in ring laser gyros to sense the direction of motion of the interference fringes past the photodiode corresponding to gyro bias and rotation. This simplifies the algorithm from that required by Table 1, because the relative polarity of the fup and fdn terms is determined from the fringe direction. Let these be called Fup and Fdn where the appropriate signator is attached. In this case, the algorithm of Table I simplifies to:

$$\text{Rate: } \Omega = \frac{K}{2}(F_{up} + F_{dn})$$

For all cases I, II, III, and IV.

$$\text{PLC Error: } e = f_0 - \frac{(F_{up} - F_{dn})}{2}$$

For all cases I, II, III, and IV. Because a full cycle is utilized, errors in the actual rate output from the computer due to the path length control not being exactly at the peak are minimized (second order effect due to non-linearity of the frequency versus voltage curve shown in FIG. 2). It is recognized that modifications and variations of the present invention will occur to those skilled in the art, and it is intended that all such modifications and variations be included within the scope of the appended claims.

What is claimed is:

1. A laser gyro including means forming a resonant cavity; an active media disposed in said cavity; mirror means coupled to said cavity to form a ring laser gyro, said mirror means including a path control mirror, an output mirror, and a magnetic mirror having two magnetization states to magnetically dither said gyro between two laser light output frequencies $f_{up}, f_{dn}$; and means for exciting said cavity into laser oscillation, the improvement comprising:
   means for detecting said output frequencies $f_{up}, f_{dn}$ of the two states of magnetization,
   means for computing a reference frequency, $f_o$, characteristic of the magnetic mirror,
   means for computing a path length error signal from the output frequencies $f_{up}, f_{dn}$ and from the reference frequency $f_o$,
   means for moving said path length control mirror,
   means for generating a drive signal from said path length error signal, said drive signal being connected to said means for moving said path control mirror, aid means for moving being responsive to said drive signal for moving said path length control mirror to a position corresponding to zero path length error signal.

2. The apparatus of claim 1 wherein the output frequencies are $f_{up}$ and $f_{dn}$ and the path length error $$e = f_0 - \frac{(f_{up} + f_{dn})}{2}$$

when $f_{up}$ is greater than $f_{dn}$ and $$\frac{f_{up} + f_{dn}}{2} \leq f_0; \quad e = f_0 - |f_{up} - f_{dn}|$$

when $f_{up}$ is greater than $f_{dn}$ and $$\frac{f_{up} + f_{dn}}{2}$$

is greater than $f_{Oe} = f_0 -$ $$\frac{f_{up} + f_{dn}}{2}$$

$(f_{up} + f_{dn})$ when $f_{up}$ is less than $f_{dn}$ and is less than or equal to $F_O$;

$$e = f_0 - \frac{|f_{up} - f_{dn}|}{2}$$

when $f_{up}$ is less than $f_{dn}$ and $$\frac{f_{up} + f_{dn}}{2}$$

is greater than $f_O$, where $f_O$ is a known reference frequency characteristic of the magnetic mirror.

3. The apparatus of claim 1 wherein the means for adjusting path length is a piezoelectric transducer.

4. The apparatus of claim 1 wherein the means responsive to output frequencies includes a photodiode.

5. The apparatus of claim 1 wherein the laser gyro includes an odd number of mirrors.

6. The apparatus of claim 1 further including a light level detector for sensing light level and for inhibiting operation of the means for computing the error signal until a predetermined threshold value of light level has been reached.

7. The apparatus of claim 1 wherein the output frequencies are $f_{up}$ and $f_{dn}$ and the path length error $e = -f_o - (f_{up} - f_{dn})/2$.

8. The apparatus of claim 1 further including means responsive to the temperature of the laser and wherein the means for computing the reference frequency corrects for the reference frequency for temperature.

9. A laser gyro including means forming a resonant cavity; an active media disposed in said cavity; mirror means coupled to said cavity to form a ring laser gyro, said mirror means including a path control mirror, an output mirror, and a magnetic mirror having two magnetization states to magnetically dither said gyro between two laser light output frequencies $f_{up}, f_{dn}$; and means for exciting said cavity into laser oscillation, the improvement comprising:
   means for detecting said output frequencies $f_{up}, f_{dn}$ of the two states of magnetization,
   means responsive to the temperature of the laser for computing a reference frequency characteristic of said magnetic mirror compensated for the temperature,
   computing means for computing a path length error signal from the output frequencies and the reference frequency, and
   means responsive to said error signal for adjusting the path length control mirror to drive the path length error signal to zero.

* * * * *